(12) United States Patent
Mochizuki

(10) Patent No.: US 6,628,633 B1
(45) Date of Patent: Sep. 30, 2003

(54) CDMA COMMUNICATION METHOD ADAPTED TO FORWARD PACKET TRANSMISSION

(75) Inventor: Takashi Mochizuki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/296,953

(22) Filed: Apr. 22, 1999

(30) Foreign Application Priority Data

Apr. 22, 1998 (JP) .......................................... 10-111692

(51) Int. Cl.[7] .............................................. H04B 7/216
(52) U.S. Cl. ........................ 370/335; 370/342; 370/468
(58) Field of Search ................................. 370/276, 277, 370/281, 295, 328–330, 335, 342, 343, 344, 473, 536, 468; 455/561, 562, 450–454

(56) References Cited

U.S. PATENT DOCUMENTS

| 5,619,491 | A |   | 4/1997  | Panzer |
|---|---|---|---|---|
| 5,673,259 | A |   | 9/1997  | Quick, Jr. |
| 5,859,840 | A | * | 1/1999  | Tiedemann, Jr. et al. ... 370/335 |
| 6,035,209 | A | * | 3/2000  | Tiedemann, Jr. et al. ... 455/522 |
| 6,049,536 | A | * | 4/2000  | Ariyoshi et al. ............ 370/335 |
| 6,269,088 | B1 | * | 7/2001  | Masui et al. ................ 370/335 |
| 6,320,851 | B1 | * | 11/2001 | Kim et al. .................... 370/320 |

FOREIGN PATENT DOCUMENTS

| EP | 0829 982 A1 | 3/1998 |
|---|---|---|
| JP | 7-312783 | 11/1995 |
| JP | 9-55693 | 2/1997 |
| JP | 9-327072 | 12/1997 |
| JP | 9-327073 | 12/1997 |
| JP | 10-13337 | 1/1998 |
| WO | WO 99/00911 | 1/1999 |
| WO | WO 99/23844 | 5/1999 |

OTHER PUBLICATIONS

Copy of European Office Action dated Jan. 21, 2003.
H Azad, et al., Multirate Spread Spectrum Direct Sequence CDMA Techniques, IEE Colloquium on Spread Spectrum Techniques for Radio Communication Systems, London, GB, Apr. 15, 1994, pp. 4/1–4/5, XP 000570787.
Povey, et al., "Hybrid FDD/TDD–CDMA for Third Generation Cellular Systems," IEE Colloquium on CDMA Techniques and Applications for Third Generation Mobile Systems, London, GB, May 19, 1997, pp. 1–6, XP002078478.
European Search Report dated Sep. 16, 2002.
K. Tsunehara, et al., "A Transmitting Power Control Scheme for Packet CDMA Mobil Communication Systems", *1997 National Convention Record of the Institute of Electronics, Information and Communication Engineers of Japan*, No. B–5–35, p. 422.

\* cited by examiner

Primary Examiner—Dwayne Bost
Assistant Examiner—Eliseo Ramos-Feliciano
(74) Attorney, Agent, or Firm—Dickstein, Shapiro, Morin & Oshinsky, LLP.

(57) ABSTRACT

In a spread spectrum communication system comprising a base station and a plurality of mobile stations, a communication band between the base station and the mobile stations are divided into a forward frequency band and a reverse frequency band. The forward frequency band is shared in the mobile stations. Each mobile station monitors a signal on the forward frequency band and extracts packet data of its own destination. The reverse frequency band is divided into a plurality of channels which are assigned to the respective mobile stations. Furthermore, allocation of spreading codes or time slots may be changed.

44 Claims, 11 Drawing Sheets

FORWARD PACKET FORMAT

FOR TRANSMISSION RATE R1

FOR TRANSMISSION RATE R2

FOR TRANSMISSION RATE R3

CDMA COMMUNICATION METHOD ADAPTED TO FORWARD PACKET TRANSMISSION

BACKGROUND OF THE INVENTION

This invention relates to a communication method and system using code division multiple access (CDMA) and, in particular, to a CDMA communication method and a spread spectrum communication system adapted to a forward packet transmission.

In a packet transmission of a CDMA communication system, generally, a spreading code and a frequency band are reserved at a time when a packet to be transmitted occurs, communication is made using a reserved spreading code and a reserved frequency band, and the reserved spreading code and the reserved frequency band are released when the communication comes to end.

Such a technique is, for example, disclosed in Japanese Unexamined Patent Publication of Tokkai No. Hei 9-327,072 or JP-A 9-327,072 (which will be called a first publication). Specifically, the first publication discloses "CDMA COMMUNICATION METHOD AND SPREAD SPECTRUM COMMUNICATION SYSTEM" each of which is capable of enhancing the flexibility of communication service by processing information individually. A frequency band for a communication zone between a base station and a plurality of terminal apparatuses (mobile stations) are divided into a forward (downlink) band in a forward direction and a reverse (uplink) band in a reverse direction. In addition, a plurality of carrier frequencies are defined corresponding to a plurality of sub-frequency bands which has one of a plurality of kinds of bandwidths in both the frequency bands. A sub-frequency band having the bandwidth in matching with the information transmission speed is preliminarily assigned to each terminal apparatus. Each terminal apparatus spreads a spectrum of a reserved packet using a reservation channel spreading code to produce a spread spectrum reserved packet and then transmits the spread spectrum reserved packet by using a specific carrier frequency corresponding to the reverse sub-frequency band. After the base station spreads a spectrum of a reply packet using a reply channel spreading code to produce a spread spectrum reply packet, the base station transmits the spread spectrum reply packet by using a particular carrier frequency corresponding to the forward sub-frequency band. After each terminal apparatus spreads a spectrum of an information packet using a spreading code for an information transmission channel designated by the reply packet to produce a spread spectrum information signal, each terminal apparatus transmits the spread spectrum information signal by using a specific carrier frequency in the reverse direction.

In addition, in the CDMA communication system, control of transmission power is important. Accordingly, as regards a pair of reverse like (uplink) and forward link (downlink), power control information of a link for transmitting data is generally transmitted using a link in the opposite direction to the link for transmitting data.

However, problems arise in the above-mentioned first publication in the manner which will presently be described.

A first problem is that transmission rates for the reverse channel and the forward channel in pairs are basically equal to each other. In other words, the same bandwidth is assigned to both of the reverse channel and the forward channel. However, in a case, for example, of accessing data on the internet, data in the forward direction are overwhelmingly greater in comparison with data in the reverse direction, and it results in wasting capacity of the reverse channel in a case where the reverse channel and the forward channel are equal to each other. Inasmuch as unless channel is established, the number of terminal apparatuses enable to be simultaneously connected is restricted. In addition, it jams communications for other terminal apparatuses where the frequency band overlaps.

In addition, in Paper No. B-5-35 to "1997-nen Denshi Jôhô Tsushin Gakkai Sôgô Taikai Yokô (1997 National Convention Record of the Institute of Electronics, Information and Communication Engineers of Japan)" discloses a method of collectively transmitting data in the forward direction by using one channel. However, this method cannot be applied to the reverse direction.

A second problem is that time for reserving a channel is required.

In addition, various other publications, which may be related to this invention, are already known. By way of example, Japanese Unexamined Patent Publication of Tokkai No. Hei 7-312,783 or JP-A 7-312,783 (which will be called a second publication) discloses "CDMA COMMUNICATION METHOD AND ITS DEVICE" each of which is capable of attaining multiplex transmission from low speed data till high speed data such as image data without much increase in the scale of the circuit. In the second publication, a basic transmission rate adopts 32 kbps higher than a usually used transmission rate of 8 kbps, the information needing a rate equal to the basic transmission rate is sent as a frame structure without an idle inter-period, and the information needing a transmission rate of 16 kbps is sent in a communication channel of frames having an idle period. Furthermore, no information is sent in an idle period other than the communication channel. Thus, the information of other channel is received for an idle period. The information at a high speed such as information whose transmission speed is 128 kbps is sent by multiplexing four channels with different spreading codes.

In addition, Japanese Unexamined Patent Publication of Tokkai No. Hei 9-055,693 or JP-A 9-055,693 (which will be called a third publication) discloses "MOBILE COMMUNICATION SYSTEM AND MOBILE TERMINAL EQUIPMENT" each of which is capable of providing a mobile communication system in which the throughput deterioration is not in existence by a reservation control packet by sending a reservation packet in the CDMA (code division multiple access) system. In the third publication, mobile terminals having a transmission request send a reservation packet through a reserved channel by the CDMA system and a base station allocates a transmission channel and a time slot available for the mobile terminals of request sources by using a reply packet outputted through a reply channel. A short spreading code corresponding to a matched filter is applied to the reservation channel. When the reservation packet is sent by the CDMA system, even when a plurality of reservation packets are caused overlapping timewise, the base station extracts each packet independently when a timing differs and it is not required to retransmit the reservation packet due to collision.

Furthermore, Japanese Unexamined Patent Publication of Tokkai No. Hei 9-327,073 or JP-A 9-327,073 (which will be called a fourth publication) discloses "METHOD FOR ARRANGING AND TRANSMITTING PILOT CHANNEL IN CDMA MOBILE COMMUNICATION SYSTEM" each of which is capable of reducing the influence of a pilot channel on the spreading code shortage by time-dividing and multiplexing an outgoing radio channel into a plurality of time slots and assigning one of them as a pilot channel. The whole outgoing radio channels consisting of X spreading codes have frame configuration and one frame is divided into the plurality of time slots so as to be multiplexed by the division. Then, the specified time slot of the radio channel spread by the specified spreading code is assigned as the pilot channel. The other time slots and the spreading codes are used as the communication channel for communication with the mobile station. For example, time slot numbers 1–4 are given to the four time slots in the frame in order from an early one in terms of time, the time slot #1 of the radio channel where the spreading code is spread by one is assigned as the pilot channel and the other time slots and the spreading codes are assigned as the communication channel.

In addition, Japanese Unexamined Patent Publication of Tokkai No. Hei 10-013,337 or JP-A 10-013,337 (which will be called a fifth publication) discloses "RADIO COMMUNICATION SYSTEM " which is capable of setting the transmission power of respective stations to a proper level when a base station and a slave station carry out two-way radio communication manly by a spread spectrum system. In the fifth publication, at first, the base station transmits, to each slave station, power control data for designating the transmission output level of the slave station from its antenna together with information data, etc. Responsive to the control data, the slave station sets a transmission output based on the data and transmits it from its antenna to the base station. Responsive to the transmission output, the base station compares data indicative of its reception level with a reference level by a comparing section. When the reception level exceeds the reference level in the comparison, the transmission output is lowered by the set level. When the reception level is lower than the reference level, the transmission output is raised by the set level and power control data for permitting the transmission output level to be the same as that of the base station is transmitted to the slave station. The slave station re-sets the transmission output based on the data and re-transmits it to the base station. The above-mentioned processing are repeated so at to execute converge in the neighborhood of the reference level.

However, the second, the fourth, and the fifth publications neither disclose nor teach allocation of frequency bands suitable to transmission rates for a reverse link and a forward link. In addition, in the similar to the first publication, the third publication is disadvantageous in that time for reserving a channel is required.

SUMMARY OF THE INVENTION

It is therefore an object of the present invention to provide a CDMA communication method and a spread spectrum communication system which are capable of effectively using a frequency band.

It is another object of the present invention to provide a CDMA communication method and a spread spectrum communication system which are capable of decreasing interference in other mobile stations simultaneously connected to a base station.

It is still another object of the present invention to provide a CDMA communication method and a spread spectrum communication system which are capable of carrying out packet transmission at a shorter communication time.

Other objects of this invention will become clear as the description proceeds.

In this invention, a wide frequency band in a forward direction is shared in a plurality of mobile stations. Each mobile station monitors a signal on the wide frequency band and extracts data of its own destination from the signal. In a reverse direction, each mobile station is assigned with a channel in accordance with a necessary transmission rate.

That is, according to an aspect of this invention, a code division multiple access (CDMA) method in a CDMA system comprises base station and a plurality of mobile stations. The CDMA method comprises the steps of dividing a communication band between the base station and the plurality of mobile stations into a forward frequency band for transmitting a forward packet from the base station to each mobile station and a reverse frequency band for transmitting a reverse packet from each mobile station to the base station, and of making a forward bandwidth for use in the forward packet from the base station to a particular mobile station and a reverse bandwidth for use in the reverse packet from the particular station to the base station differ from each other. For example, the forward frequency band is used for the forward packet from the base station to each mobile station in common. In this event, the base station spreads a spectrum of the forward packet including a destination terminal identifier using a forward spreading code to produce a spread spectrum forward packet, and transmits the spread spectrum forward packet by using the forward frequency band.

In a more limited structure of the above-mentioned CDMA communication method, the reverse frequency band is divided into a plurality of reverse channels. Each mobile station is assigned with, as a selected reverse channel, one having a bandwidth corresponding to a reverse information amount of the mobile station selected from the plurality of reverse channels. Each mobile station monitors the forward packet transmitted by using the forward frequency band. A specific mobile station, which is destination of the forward packet, transmits a reply signal by using the selected reverse channel assigned to the specific mobile station with the reply signal spread spectrum using a reverse spreading code.

In a furthermore limited structure of the above-mentioned CDMA communication method, the base station preliminarily determines a plurality of forward spreading codes for use in spreading a spectrum of the forward packet, divides the forward packet in an information amount enable to transmit by using the forward frequency band using respective forward spreading codes into divided forward packets, and transmits the divided forward packets by using the forward frequency band. In addition, the base station simultaneously transmits a plurality of forward packets which are spread spectrum using different forward spreading codes. Furthermore, the reply signal which the mobile station transmits includes information indicative of a reception level of the forward packet.

According to another aspect of this invention, a spread spectrum communication system comprises a base station and a plurality of mobile stations. A communication band between the base station and each mobile station comprises a forward frequency band for transmitting a forward packet from the base station to each mobile station and a reverse frequency band for transmitting a reverse packet from each mobile station to the base station. The forward frequency band is used for each mobile station in common. The reverse frequency band comprises a plurality of reverse channels. Each mobile station is assigned with at least one of the reverse channels. The base station comprises a base station modulating arrangement for spreading a spectrum of the forward packet including a destination terminal identifier using a forward spreading code to produce a spread spectrum forward packet and a base station transmitting arrangement for transmitting the spread spectrum forward packet by using the forward frequency band.

In a more limited structure of the above-mentioned spread spectrum communication system, the base station further comprises a reply signal receiving arrangement for receiving a spread spectrum reply signal on a reverse channel assigned to the mobile station. Connected to the reply signal receiving arrangement, a reply signal demodulating arrangement despreads the spread spectrum reply signal using a reverse spreading code assigned to the mobile station. The reply signal demodulating arrangement reproduce a reply signal. Each mobile station comprises a terminal receiving arrangement for receiving the spread spectrum forward packet transmitted on said forward frequency band to produce a received forward packet. Connected to the terminal receiving arrangement, a terminal demodulating arrangement despreads the received forward packet using the forward spreading code to reproduce the forward packet. Connected to the terminal demodulating arrangement, an identifying arrangement identifies the destination terminal identifier in the forward packet. Connected to the identifying arrangement, a terminal modulating arrangement spreads a spectrum of the reply signal using a reverse-spreading code assigned to the mobile station when the mobile station has the destination terminal identifier. The terminal modulating arrangement produces the spread spectrum reply signal. Connected to the terminal modulating arrangement, a terminal transmitting arrangement transmits the spread spectrum reply signal by using the reverse channel assigned to the mobile station.

In a furthermore limited structure of the above-mentioned spread spectrum communication system, the base station has a plurality of forward spreading codes for use in spreading a spectrum of the forward packet. The base station comprises a packet dividing arrangement for dividing the forward packet in an information amount enable to transmit on the forward frequency band using the each forward spreading code to produce a plurality of divided forward packets which are supplied to the base station modulating arrangement. In addition, the base station modulating arrangement includes an adding arrangement for adding a plurality of spread spectrum forward packets to produce an added spread spectrum forward packet. Furthermore, each mobile station comprises a power measuring arrangement for measuring a reception level of the forward packet to produce a reception level measured signal. The reply signal includes the reception level measured signal. The base station further comprises a separating arrangement for separating the reception level measured signal from the reply signal. Connected to the separating arrangement and the base station modulating arrangement, an adjusting arrangement adjusts, in response to the reception level measured signal, transmission power of the forward packet for the mobile station that is prepared by the base station modulating arrangement.

Inasmuch as reverse and forward channels are assigned with frequency bands suitable to transmission rates of the reverse and the forward channels, respectively, it is possible to realize an effective use of the frequency bands. To widen a forward frequency band can cope with a high transmission rate. To share the forward frequency band with a plurality of mobile stations can restrict a necessary bandwidth in a system. Inasmuch as each mobile station monitors a forward signal of a shared band and extracts data of its own destination without reservation of a frequency band and a spreading code every packet, a communication time for reservation is unnecessary. It is possible to decrease interference between mobile stations simultaneously connected by changing allocation of forward frequency bands every mobile station. It is possible to identify a signal from each mobile station by changing spreading codes within the same frequency band.

DESCRIPTION OF THE PREFERRED EMBODIMENTS

Figure 1:
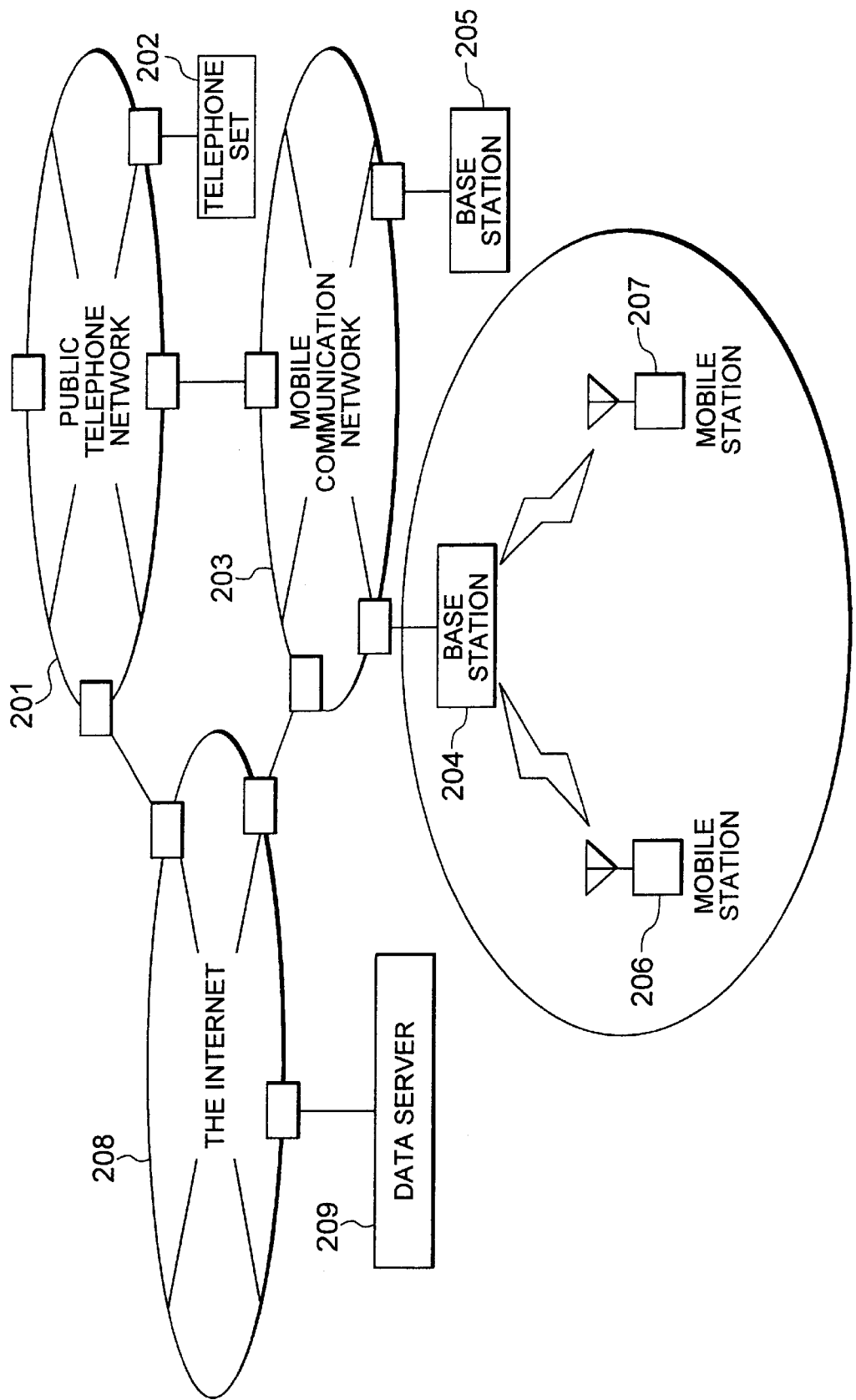
FIG. 1 is a block diagram of a mobile communication system to which a CDMA communication method according to this invention is applicable.

Referring to FIG. 1, description will proceed to a mobile communication system to which a CDMA communication method according to an embodiment of the present invention is applicable. As shown in FIG. 1, the illustrated mobile communication system comprises a public telephone network 201, a telephone set 202 connected to the public telephone network 201, a mobile communication network 203 connected to the public telephone network 201, first and second base stations 204 and 205 in the mobile communication network 203, first and second mobile stations (mobile terminal apparatuses) 206 and 207 belonging to a service area covered by the first base station 204, the internet 208, and a data server 209 connected to the internet 208.

Each of the first and the second mobile stations 204 and 205 carries out radio communication via the first base station 204 covering the service area to which the first and the second mobile stations 204 and 205 belong. Information to be communicated is multimedia information where an audio signal, an image (picture) signal, data or the like are mixed.

Figure 2:
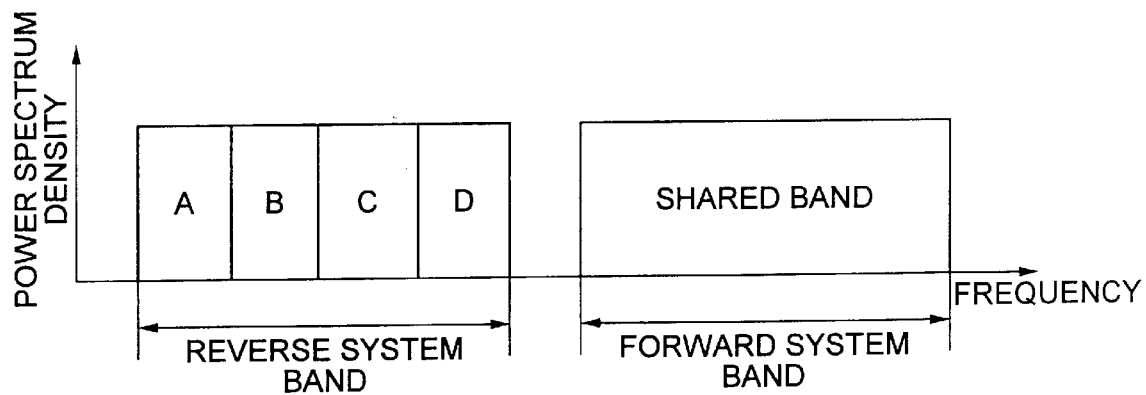
FIG. 2 shows system bands for use in describing the CDMA communication method and a spread spectrum communication apparatus according to this invention.

FIG. 2 shows structure of frequency bands for a radio communication which is carried out between the first base station 204 and the first and the second mobile stations 206 and 207. In FIG. 2, the ordinate represents a power spectrum density and the abscissa represents a frequency. A communication band between the base station and the mobile station is separated or divided into a reverse frequency band turning from each mobile station to the base station and a forward frequency band turning from the base station to each mobile station. The reverse frequency band is called a reverse system band while the forward frequency band is called a forward system band. The reverse frequency band is divided or separated into a plurality of reverse sub-frequency bands. In the example being illustrated, the reverse sub-frequency bands are equal in number to four which are called first through fourth reverse sub-frequency bands depicted at A, B, C, and D in FIG. 2. Each reverse sub-frequency band is referred to as a reverse channel.

Each mobile station is assigned with the reverse sub-frequency band (channel) and a reverse spreading code. The reverse sub-frequency band may be time divided into a plurality of reverse time slots which may be assigned to the mobile stations. The base station spreads a spectrum of a forward packet using a forward spreading code in accordance with a data amount of the forward packet to produce a spread spectrum forward packet and transmits the spread spectrum forward packet by using the forward frequency band. In addition, various allocation methods for the channels may be used. For example, the channel is assigned to the mobile station when the mobile station is recorded to the base station.

Each mobile station receives the spread spectrum forward packet and despreads a spectrum of the spread spectrum forward packet using the forward spreading code to reproduce the forward packet.

Figure 3:
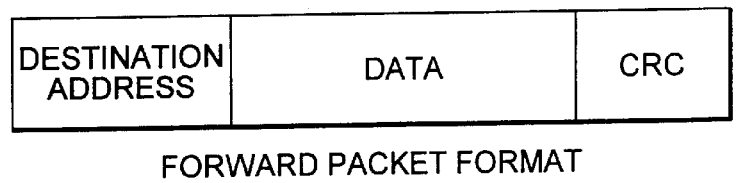
FIG. 3 shows a format of a forward packet for use in the CDMA method according to this invention.

FIG. 3 shows a format for the forward packet. As shown in FIG. 3, the forward packet is attached with a destination address which corresponds to a destination terminal identifier. Accordingly, each mobile station checks the destination address in the forward packet to monitor whether or not the forward packet is a packet of its own destination. In addition, a reference symbol of CRC represents a cyclic redundancy code.

Responsive to the forward packet of its own destination, the mobile station spreads a spectrum of a reply signal using a reverse spreading code assigned to the mobile station to produce a spread spectrum reply signal and transmits the spread spectrum reply signal by using the reverse sub-frequency band assigned to the mobile station. If the reverse sub-frequency band is time divided into a plurality of reverse time slots, the mobile station transmits the spread spectrum reply signal by using the reverse time slot assigned to the mobile station.

Description will proceed to operation of this invention.

Figure 4A:
FIGS. 4A through 4C show examples of spreading codes for a forward system band.
Figure 4B:
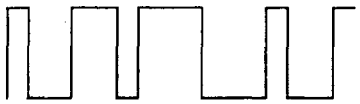
Figure 4C:
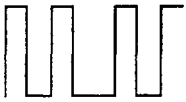

As illustrated in FIGS. 4A, 4B, and 4C, the base station uses different forward spreading codes for transmission rates in a process which spreads the forward packets in accordance with an amount of data. Specifically, it will be assumed that the base station uses three transmission rates: a low transmission rate R1 for a small amount of data; a medium transmission rate R2 for a middle amount of data; and a high transmission rate R3 for a large amount of data. Under the circumstances, when transmission data has a small amount, the base station uses a long forward spreading code (FIG. 4A) for the low transmission rate R1 and spreads the transmission data using the long forward spreading code within the forward frequency band at a low power density and at a long transmission time. When the transmission data has a large amount, the base station uses a short forward spreading code (FIG. 4C) for the high transmission rate R3 and spreads the transmission data using the short forward spreading code within the forward frequency band at a high power density and at a short transmission time. When the transmission data has a middle amount, the base station uses a medium forward spreading code (FIG. 4B) for the medium transmission rate R2 and spreads the transmission data using the medium forward spreading code within the forward frequency band at a middle power density and at a medium transmission time.

In a case where a plurality of mobile stations belong to a service area (cell) which one base stations covers, when the base station transmits forward packets to the respective mobile stations, the base station transmits the forward packets by using the forward frequency band which is time divided. It will be assumed the first and the second mobile stations 206 and 207 belong to the service area which the first base station 204 covers as illustrated in FIG. 1. The first and the second mobile stations 206 and 207 will later be called a terminal 1 and a terminal 2.

Figure 5:
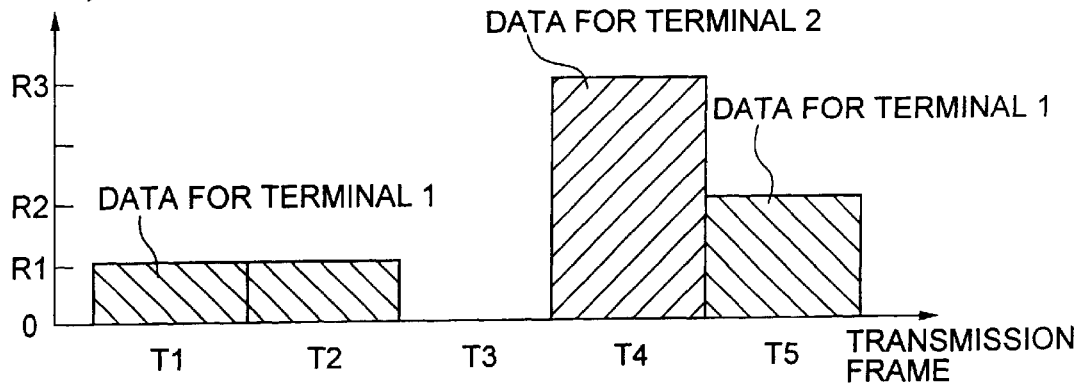
FIG. 5 is a view for use in describing a scheduling of the forward system band.

Under the circumstance, the base station transmits the forward packets in the manner, for example, as illustrated in FIG. 5. In FIG. 5, the ordinate represents a transmission rate [kbit/sec] and the abscissa represents a transmission frame. FIG. 5 illustrates five frames consisting of first through fifth frames T1 to T5. In FIG. 5, transmission in the forward direction is carried out at a constant time interval (frame) as a unit. In the example being illustrated in FIG. 5, transmission data for the terminal 1 is transmitted at the low transmission rate R1 by using the first and the second frames T1 and T2, no transmission is carries out at the third frame T3, transmission data for the terminal 2 is transmitted at the high transmission rate R3 by using the fourth frame T4, and transmission data for the terminal 1 is transmitted at the medium transmission rate R2 by using the fifth frame T5.

Figure 6A:
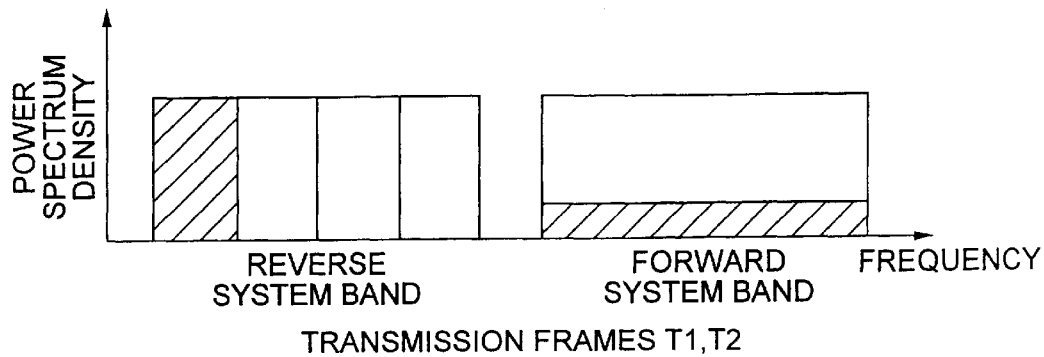
FIGS. 6A through 6D are views showing time variations of a power spectrum density of the forward system band.
Figure 6B:
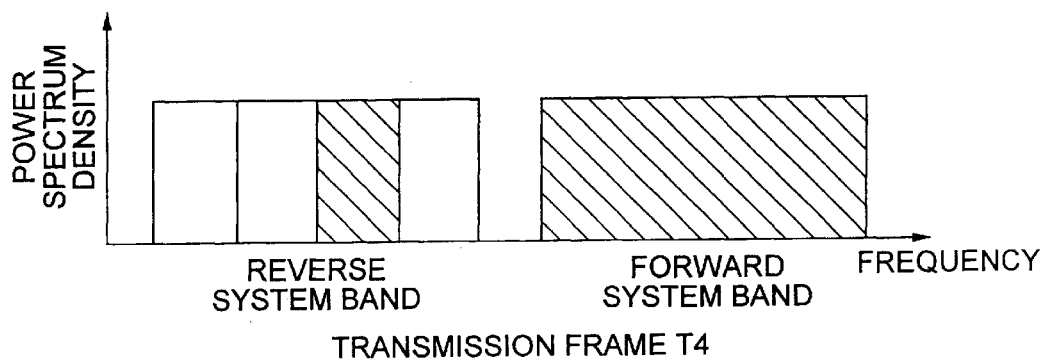
Figure 6C:
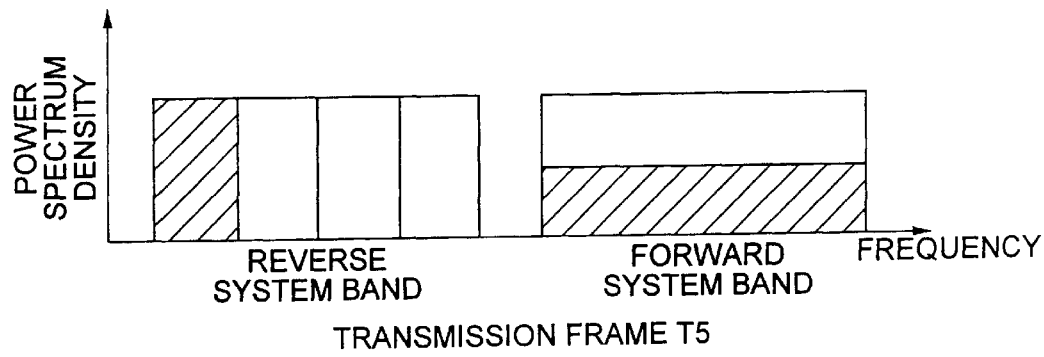
Figure 6D:
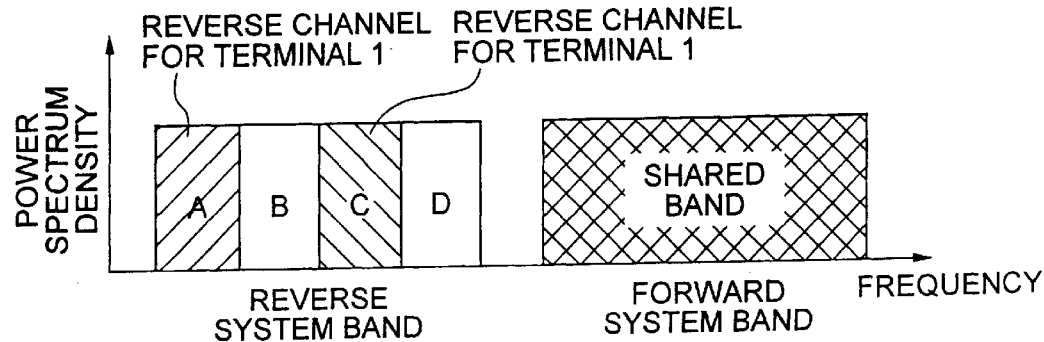

FIGS. 6A through 6D illustrate states of the power density in this state. In each of FIGS. 6A through 6D, the ordinate represents a power spectrum density and the abscissa represents a frequency. FIG. 6A illustrates the state of the power density at the first and the second transmission frames T1 and T2, FIG. 6B illustrates the state of the power density at the third transmission frame T3, FIG. 6C illustrates the state of the power density at the fifth transmission frame T5, and FIG. 6D illustrates the state of frequency allocation.

It will be assumed that the reverse frequency band is divided into the four sub-frequency bands A, B, C, and D as illustrated in FIG. 2 and the terminals 1 and 2 are assigned with the sub-frequency bands A and C, respectively, as illustrated in FIG. 6D.

Inasmuch as the forward spreading code for the low transmission rate R1 is used at the first and the second transmission frames T1 and T2, the forward packet is transmitted at the low power density within the forward frequency band, as illustrated in FIG. 6A. On the other hand, inasmuch as the forward spreading code for the high transmission rate R3 is used at the fourth transmission frame T4, the forward packet is transmitted at the high power density within the forward frequency band, as illustrated in FIG. 6B. In addition, inasmuch as the forward spreading code for the medium transmission rate R2 is used at the fifth transmission frame T5, the power density of the forward packet within the forward frequency band is medium between the low power density and the high power density.

Each mobile station despreads a spectrum of the forward signal using the forward spreading codes for the possible transmission rates R1, R2, and R3 to monitor the forward signal. If data are transmitted, each mobile station determines whether or not the transmitted data are for its own destination in reference with the destination address therein. If the transmitted data are the packet of its own destination, the mobile station replies a reply signal by using the reverse sub-frequency band assigned thereto. The reply signal includes, for example, a reply indicating whether or not the forward packet is correctly received or power control information for the forward signal. For this purpose, each mobile station includes a power measurement arrangement (not shown) for measuring a reception level of the forward packet and the power measurement arrangement produces a reception level measured signal as the above-mentioned power control information for the forward signal.

In FIG. 5, it is presumed that the medium transmission rate R2 and the high transmission rate R3 are twice and four times as large as the low transmission rate R1, respectively. Under the circumstances, data transmitted at the fourth and the fifth transmission frames T4 and T5 have amounts of data which are four times and twice as large as an amount of data transmitted at the first transmission frame T1.

Figure 7:
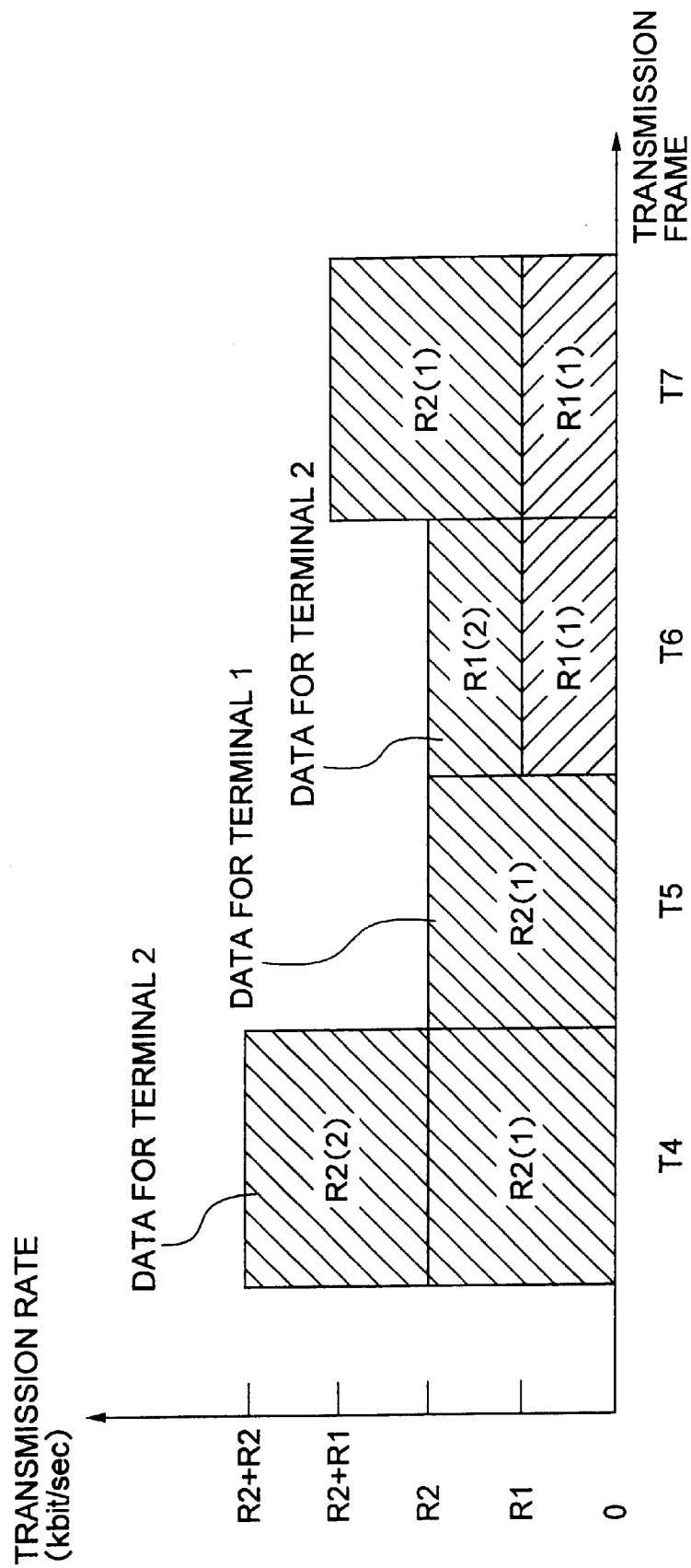
FIG. 7 is a view for use in describing another scheduling of the forward system band.

FIG. 7 illustrates a packet transmission method which is different from that illustrated in FIG. 5. In FIG. 7, the ordinate represents a transmission rate [kbit/sec] and the abscissa represents a transmission frame. FIG. 7 illustrates five frames consisting of four through seventh frames T4 to T7.

The packet transmission method illustrated in FIG. 7 does not use the forward spreading code for the high transmission rate R3 but uses two forward spreading codes R1(1) and R1(2) for the low transmission rate RI and two forward spreading codes R2(1) and R2(2) for the medium transmission rate R2 instead of the forward spreading code for the high transmission rate R3.

At the fourth transmission frame T4 in FIG. 7, data are spread using the two forward spreading codes R1(1) and R1(2) for the medium transmission rate R2 without using the forward spreading code for the high transmission rate R3.

At the sixth and the seventh transmission frames T6 and T7 in FIG. 7, data for the terminals 1 and 2 are simultaneously transmitted using different forward spreading codes. This is because it is possible for each mobile station to separate the data on reception by using the different forward spreading codes although data for different terminals are simultaneously transmitted. At the seventh transmission frame T7, data for the terminals 1 and 2 are transmitted at different transmission rates R1 and R2 as well as using different forward spreading codes R1(1) and R2(1).

Figure 8:
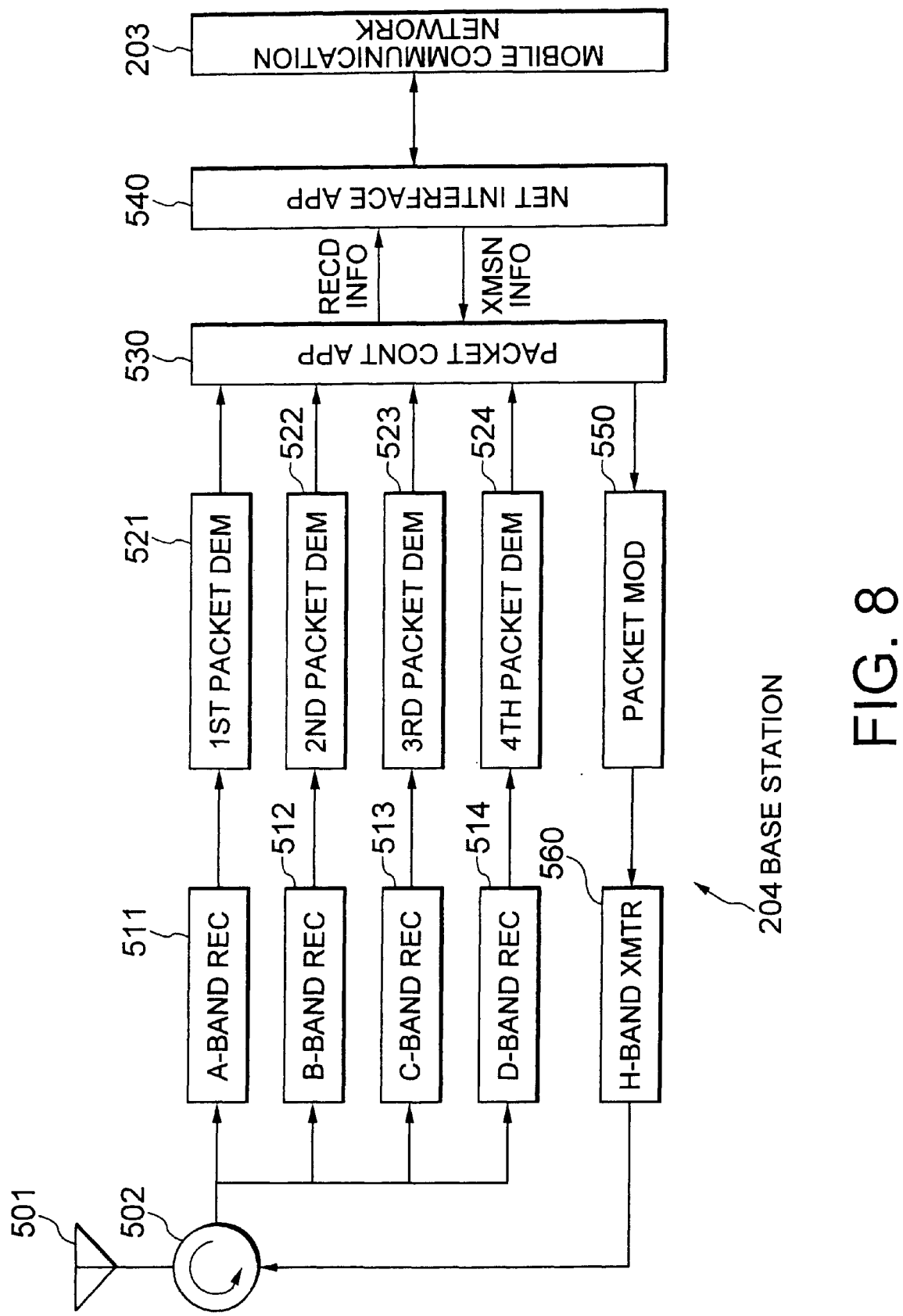
FIG. 8 is a block diagram of a base station for use in the mobile communication system illustrated in FIG. 1.

Referring to FIG. 8, description will proceed to structure of the base station 204 for realizing the packet transmission method illustrated in FIG. 5. The illustrated base station 204 has structure enable to accommodate a plurality of mobile stations including the first and the second mobile stations 206 and 207, as illustrated in FIG. 1.

As illustrated in FIG. 8, the base station 204 comprises a base station antenna 501, a base station circulator 502, first through fourth base station receivers 511, 512, 513, and 514, first through fourth packet base station demodulators 521, 522, 523, and 524, a base station packet control apparatus 530, a network interface apparatus 540, a base station packet modulator 550, and a base station H-band transmitter 560. Inasmuch as the first through the base station fourth receivers 511 to 514 have the first through the fourth reverse sub-frequency bands (channels) A, B, C, and D, respectively, as illustrated in FIG. 3, the first through the fourth base station receivers 511 to 514 are called an A-band receiver, a B-band receiver, a C-band receiver, and a D-band receiver, respectively.

The base station circulator 502 separates a transmission signal from a received signal. The base station packet control apparatus 530 processes reverse packets supplied from the first through the fourth base station packet demodulators 521 to 524 and supplies a forward packet indicative of transmission information to the base station packet modulator 550. Transmitted from the mobile communication network 203, the forward packet is supplied to the base station packet control apparatus 530 through the network interface apparatus 540. The base station packet control apparatus 530 schedules the forward packet to send the forward packet to the base station packet modulator 550. In the manner which will presently be described, the base station packet modulator 550 spreads a spectrum of the forward packet to produce a spread spectrum forward packet.

Figure 9:
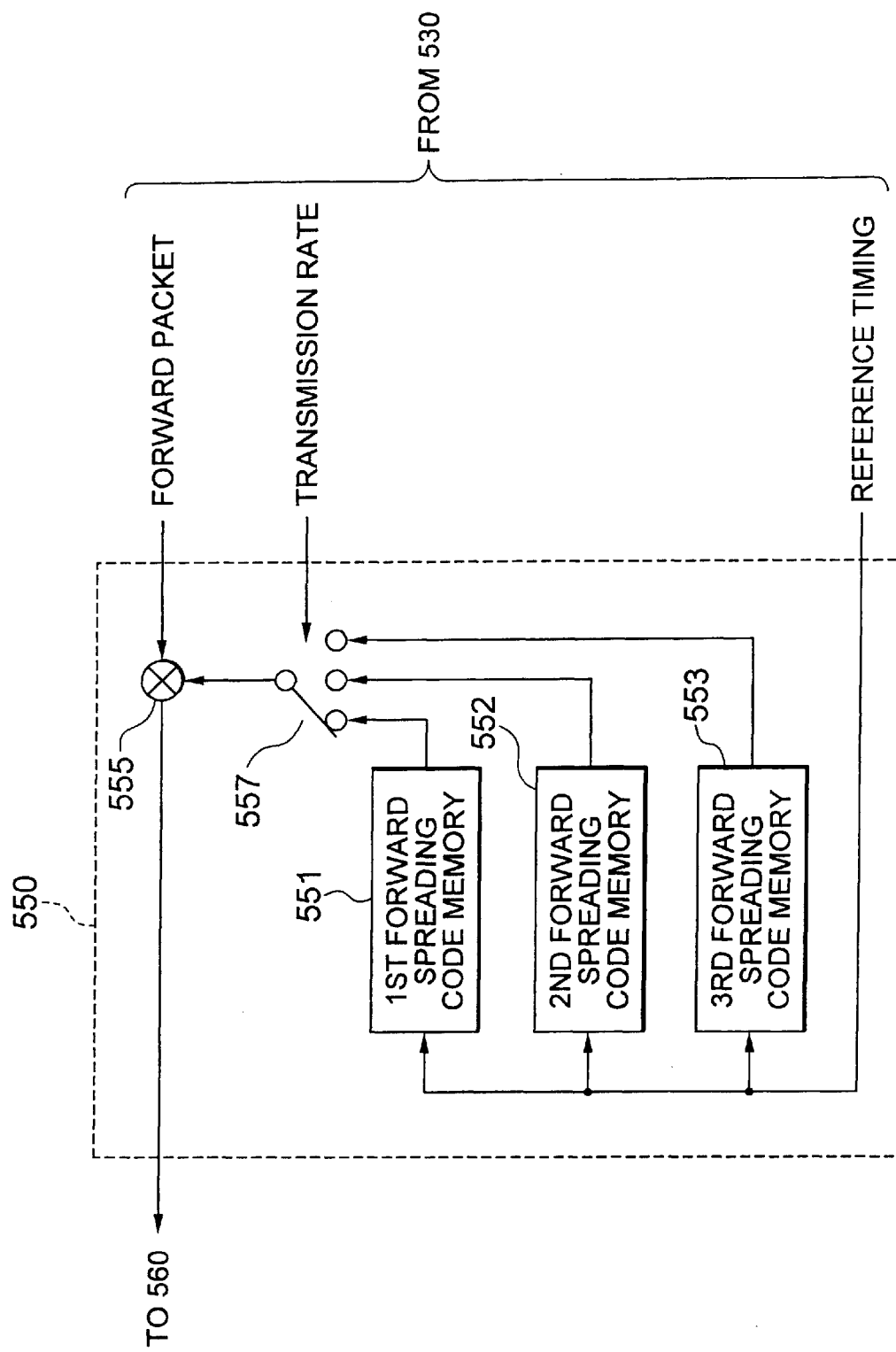
FIG. 9 is a block diagram of a packet modulator for use in the base station illustrated in FIG. 8.

Turning to FIG. 9, the base station packet modulator 550 comprises a first base station forward spreading code memory 551 for storing a first forward spreading code for the low transmission rate R1, a second base station forward spreading code memory 552 for storing a second forward spreading code for the medium transmission rate R2, a third base station forward spreading code memory 553 for storing a third forward spreading code for the high transmission rate R3, a base station multiplier 555, and a base station selector 557.

The first through the third base station forward spreading code memories 551 to 553 are supplied with a reference timing signal from the base station packet control apparatus 530 (FIG. 8). Responsive to the reference timing signal, the first through the third base station forward spreading code memories 551 to 553 produce the first through the third forward spreading codes stored therein. The first through the third forward spreading codes are supplied to the base station selector 557. The base station selector 557 is supplied with a selection signal corresponding to the transmission rate from the base station packet control apparatus 530 (FIG. 8). Responsive to the selection signal, the base station selector 557 selects one of the first through the third forward spreading codes as a selected forward spreading code. The selected forward spreading code is supplied to the base station multiplier 555. The base station multiplier 555 is supplied with the forward packet from the base station packet control apparatus 530 (FIG. 8). The base station multiplier 555 multiplies the forward packet by the selected forward spreading code to produce the spread spectrum forward signal.

In the manner as described above, the base station packet modulator 550 spreads the spectrum of the forward packet using the forward spreading code in accordance with the transmission rate to produce the spread spectrum forward signal.

Turning back to FIG. 8, the spread spectrum forward signal is supplied to the H-band transmitter 560. The H-band transmitter 560 modulates a carrier of the H-band by the spread spectrum forward packet to produce a modulated forward signal as the transmission signal. The transmission signal is transmitted via the base band circulator 502 from the base band antenna 501.

On the other hand, a transmission signal from each mobile station is received at the base station antenna 501 as the received signal. The received signal is supplied to the first through the fourth base station receivers 511 to 514 through the base station circulator 502. The first base station receiver or the A-band receiver 511 receives and demodulates the received signal having the first reverse sub-frequency band A to produce a first received reverse signal. The second base station receiver or the B-band receiver 512 receives and demodulates the received signal having the second reverse sub-frequency band A to produce a second received reverse signal. The third base station receiver or the C-band receiver 513 receives or demodulates the received signal having the third reverse sub-frequency band B to produce a third received reverse signal. The fourth base station receiver or the D-band receiver 514 receives or demodulates the received signal having the fourth reverse sub-frequency band B to produce a fourth received reverse signal. The first through the fourth received reverse signals are supplied to the first through the fourth base station packet demodulators 521 to 524, respectively.

The first base station packet demodulator 521 demodulates the first received reverse signal by despreading the first received reverse signal using a first reverse spreading code to reproduce a first reverse signal. The second base station packet demodulator 522 demodulates the second received reverse signal by despreading the second received reverse signal using a second reverse spreading code to reproduce a second reverse signal. The third base station packet demodulator 523 demodulates the third received reverse signal by despreading the third received reverse signal using a second reverse spreading code to reproduce a third reverse signal. The fourth base station packet demodulator 524 demodulates the fourth received reverse signal by despreading the fourth received reverse signal using a fourth reverse spreading code to reproduce a fourth reverse signal. The first through the fourth reverse signals are supplied to the base station packet control apparatus 530.

The base station packet control apparatus 530 adjusts, in response to the first through the fourth reverse signals, transmission power for the forward packet on the basis of the above-mentioned reception level measured signal. That is, each of the first and the fourth reverse signal is called a reply signal. The base station packet control apparatus 530 serves as a separating unit for separating the reception level measured signal from the reply signal and serves as an adjusting unit for adjusting the transmission power of the forward packet in response to the reception level measured signal. If necessary, the base station packet control apparatus 530 sends the reception level measured signal or a power control signal to the mobile communication network 203 through the network interface apparatus 540.

Figure 10:
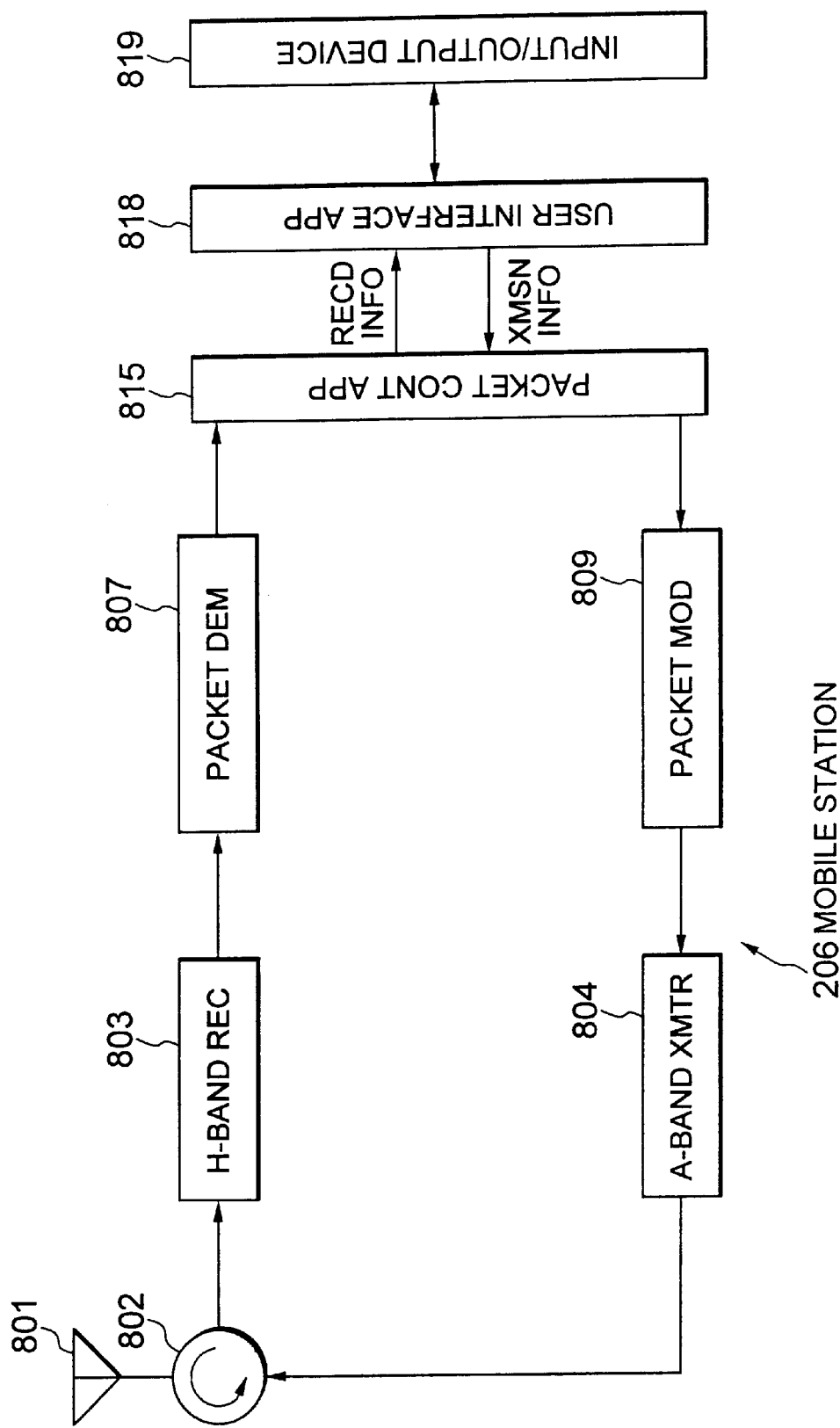
FIG. 10 is a block diagram of a mobile station for use in the mobile communication system illustrated in FIG. 1.

Referring to FIG. 10, description will proceed to structure of the first mobile station 206 for realizing the packet transmission method illustrated in FIG. 5. As illustrated in FIG. 10, the first mobile station 206 comprises a terminal antenna 801, a terminal circulator 802, a terminal H-band receiver 803, a terminal transmitter 804, a terminal packet demodulator 807, a terminal packet modulator 809, a terminal packet control apparatus 815, a user interface apparatus 818, and an input/output device 819.

The terminal H-band receiver 803 receives and demodulates the H-band signal having the forward frequency band into a received forward signal. The received forward signal is supplied to the terminal packet demodulator 807. The terminal packet demodulator 807 despreads the received forward signal using the above-mentioned forward spreading code to reproduce the forward packet indicative of received information. The forward packet is supplied to the terminal packet control apparatus 815. The terminal packet control apparatus 815 sends the forward packet to the input/output device 819 through the user interface apparatus 818.

The terminal packet control apparatus 815 acts as an identifying unit for identifying the destination terminal identifier in the forward packet. When an identified destination terminal identifier coincides with its own destination terminal identifier assigned to the first mobile station 206, the terminal packet control apparatus 815 sends the reply signal indicative of acknowledgment (ACK) to the terminal packet modulator 809.

In addition, the terminal packet control apparatus 815 prepares the power control signal (reception level measured signal) for the forward packet. That is, the terminal packet control apparatus 815 acts as a power measuring unit for measuring a reception level of the forward packet to produce the reception level measured signal or the power control signal. The terminal packet control apparatus 815 sends, as the reverse packet, the reply signal including the power control signal to the packet modulator 809. The terminal packet control apparatus 815 carries out sending timing operation for the reverse packet to supply a reference timing signal to the terminal packet modulator 809.

The terminal packet modulator 809 spreads the spectrum of the reverse packet (the reply signal) using the reverse cording signal to produce a spread spectrum reverse signal (spread spectrum reverse signal). The spread spectrum reverse signal is supplied to the terminal transmitter 804. The terminal transmitter 804 modulates a carrier by the spread spectrum reverse signal. In the first mobile station 206, the terminal transmitter 804 transmits a transmission signal by using the first reverse sub-frequency band (channel) A assigned to the first mobile station 206. Accordingly, the terminal transmitter 804 is called a terminal A-band transmitter.

Figure 11:
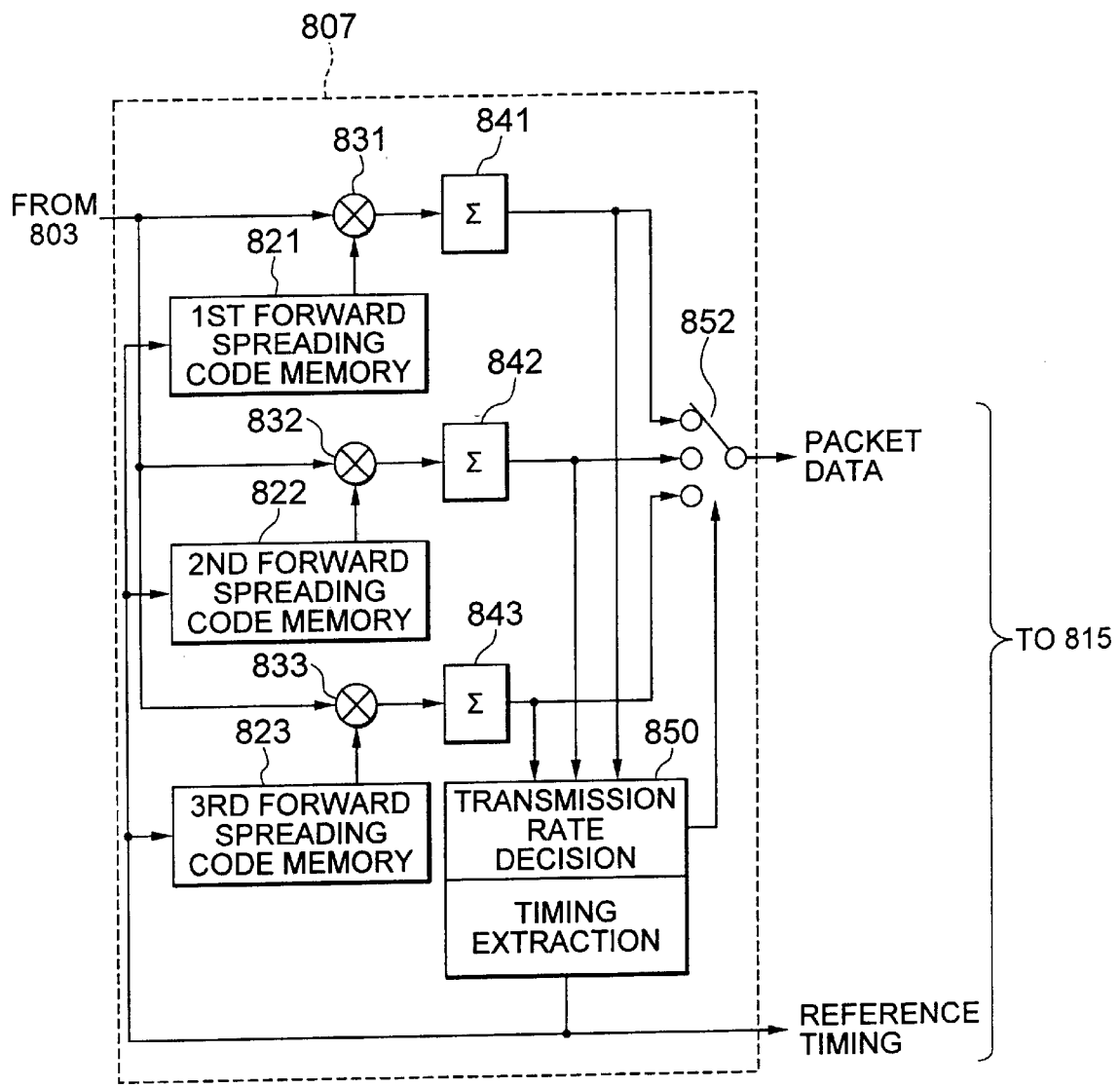
FIG. 11 is a block diagram of a packet demodulator for use in the mobile station illustrated in FIG. 10.

Turning to FIG. 11, description will proceed to the terminal packet demodulator 807. Inasmuch as the packet transmission method illustrated in FIG. 5 has three transmission rates, the terminal packet demodulator 807 carries out despreading operation using three forward spreading codes corresponding to the three transmission rates.

The terminal packet demodulator 807 comprises first through third terminal spreading code memories 821, 822, and 823, first through third terminal multipliers 831, 832, and 833, first through third accumulators 841, 842, and 843, a decision and timing extracting section 850, and a terminal selector 852.

The first terminal spreading code memory 821 stores the first forward spreading code for the low transmission rate R1 therein. The second terminal spreading code memory 822 stores the second forward spreading code for the medium transmission rate R2 therein. The third terminal spreading code memory 823 stores the third forward spreading code for the high transmission rate R3 therein. The first through the third terminal spreading code memories 821 to 823 are supplied with a reference timing signal from the decision and timing extracting section 850. Responsive to the reference timing signal, the first through the third terminal spreading code memories 821 to 823 produce the first through the third forward spreading codes stored therein, respectively. The first through the third forward spreading codes are supplied to the first through the third terminal multipliers 831 to 833, respectively. The first through the third terminal multipliers 831 to 833 are supplied with the received forward signal from the H-band receiver 803 (FIG. 10).

The first terminal multiplier 831 multiplies the received forward signal by the first forward spreading code to produce a first terminal multiplied signal. The second terminal multiplier 832 multiplies the received forward signal by the second forward spreading code to produce a second terminal multiplied signal. The third terminal multiplier 833 multiplies the received forward signal by the third forward spreading code to produce a third terminal multiplied signal. The first through the third terminal multiplied signals are supplied to the first through the third accumulators 841, 842, and 843, respectively. The first accumulator 841 accumulates the first terminal multiplied signal every a length of the first forward spreading code to produce a first accumulated signal. The second accumulator 842 accumulates the second terminal multiplied signal every a length of the second forward spreading code to produce a second accumulated signal. The third accumulator 843 accumulates the third terminal multiplied signal every a length of the third forward spreading code to produce a third accumulated signal. The first through the third accumulated signals are supplied to the decision and timing extracting section 850 and the terminal selector 852.

The decision and timing extracting section 850 decides a transmission rate on the basis of a cyclic redundancy check (CRC) error in the first through the third accumulated signals to supply a decided result signal indicative of the transmission rate to the terminal selector 852. Responsive to the decided result signal, the terminal selector 852 selects one of the first through the third accumulated signals as a selected accumulated signal. The terminal selector 852 produces the selected accumulated signal as the forward packet which is supplied to the terminal packet control apparatus 815 (FIG. 10). In addition, the decision and timing extracting section 850 extracts or generates, in response to the decided result signal, the reference timing signal from the first through the third accumulated signals. The reference timing signal is supplied to the first through the third terminal spreading code memories 821 to 823 and the terminal packet control apparatus 815 (FIG. 10).

It will be assumed that the packet transmission method is changed from that illustrated in FIG. 5 to that illustrated in FIG. 7. In this event, the base station and the mobile station are similar in structure and operation to those illustrated in FIGS. 8 and 10 except that the base station packet modulator 550 and the terminal packet demodulator 807 are modified from those illustrated in FIGS. 9 and 11 as will later become clear. The base station packet modulator and the terminal packet demodulator used as adapting to the packet transmission method illustrated in FIG. 7 are therefore depicted at 550A and 807A, respectively. The base station packet modulator 550A simultaneously spreads spectra of a plurality of forward packets using a plurality of forward spreading codes. The terminal packet demodulator 807A despreads the received forward signal using the plurality of forward spreading codes to combine despread signals.

Figure 12:
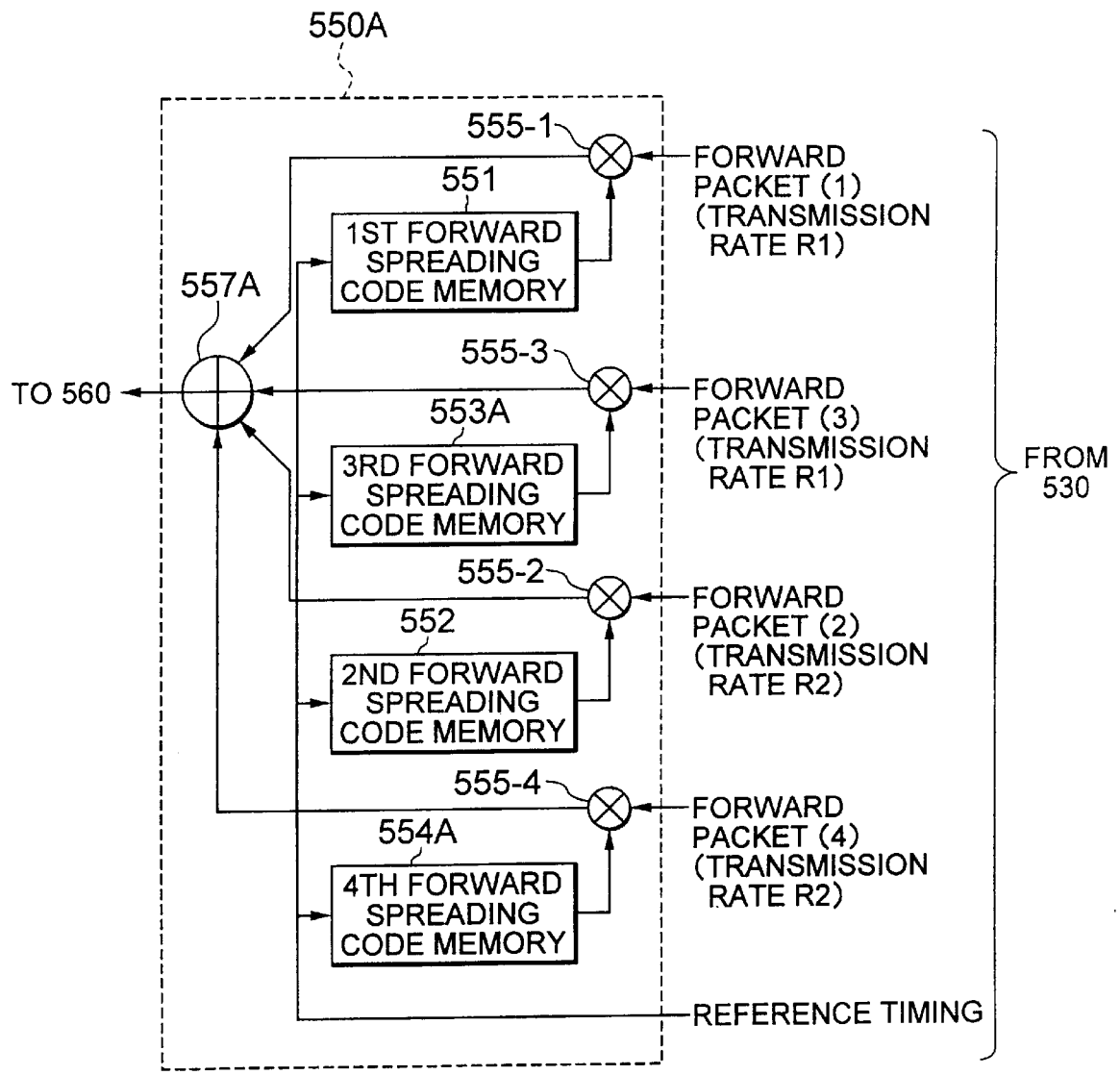
FIG. 12 is a block diagram of another packet modulator for use in the base station illustrated in FIG. 8.

Turning to FIG. 12, description will proceed to the base station packet modulator 550A. The base station packet modulator 550A comprises a first base station forward spreading code memory 551 for storing a first forward spreading code R1(1) for the low transmission rate R1 therein, a second base station forward spreading code memory 552 for storing a second forward spreading code R2(1) for the medium transmission rate R2 therein, a third base station forward spreading code memory 553A for storing a third forward spreading code for the low transmission rate R1, a fourth base station forward spreading code memory 554A for storing a fourth forward spreading code for the medium transmission rate R2, first through fourth base station multipliers 555-1, 555-2, 555-3, and 555-4, and an adder 557A.

The first through the fourth base station forward spreading code memories 551 to 554A are supplied with the reference timing signal from the base station packet control apparatus 530 (FIG. 8). Responsive to the reference timing signal, the first through the fourth base station forward spreading code memories 551 to 554A produce the first through the fourth forward spreading codes stored therein, respectively. The first through the fourth forward spreading codes are supplied to the first through the fourth base station multipliers 555-1 to 555-4, respectively. The first base station multiplier 555-1 is supplied with a first forward packet (1) having the low transmission rate RI from the base station packet control apparatus 530 (FIG. 8). The second base station multiplier 555-2 is supplied with a second forward packet (2) having the medium transmission rate R2 from the base station packet control apparatus 530. The third base station multiplier 555-3 is supplied with a third forward packet (3) having the low transmission rate R1 from the base station packet control apparatus 530. The base station fourth multiplier 555-4 is supplied with a fourth forward packet (4) having the medium transmission rate R2 from the base station packet control apparatus 530.

The first through the fourth forward packets are called divided forward packets. The base station packet control apparatus 530 (FIG. 8) serves as a packet dividing unit for dividing the forward packet in an information amount enable to transmit on the forward frequency band using each forward spreading code to produce the divided forward packets.

The first base station multiplier 555-1 multiplies the first forward packet (1) by the first forward spreading code to produce a first base station multiplied signal. The second base station multiplier 555-2 multiplies the second forward packet (2) by the second forward spreading code to produce a second base station multiplied signal. The third base station multiplier 555-3 multiplies the third forward packet (3) by the third forward spreading code to produce a third base station multiplied signal. The fourth base station multiplier 555-4 multiplies the fourth forward packet (4) by the fourth forward spreading code to produce a fourth base station multiplied signal. The first through the fourth base station multiplied signals are supplied to the adder 557A. The adder 557A sums the first through the fourth base station multiplied signals to produce an added spread spectrum forward signal.

Each of the first through the fourth base station multiplied signals is referred to as a spread spectrum forward signal. Accordingly, the adder 557A adds a plurality of spread spectrum forward signals to produce the added spread spectrum forward signal.

In the manner as described above, the base station packet modulator 550A spreads the spectra of four divided forward packets having two transmission rates using four forward spreading codes and sums four spread spectrum forward signals to produce the added spread spectrum forward signal.

Figure 13:
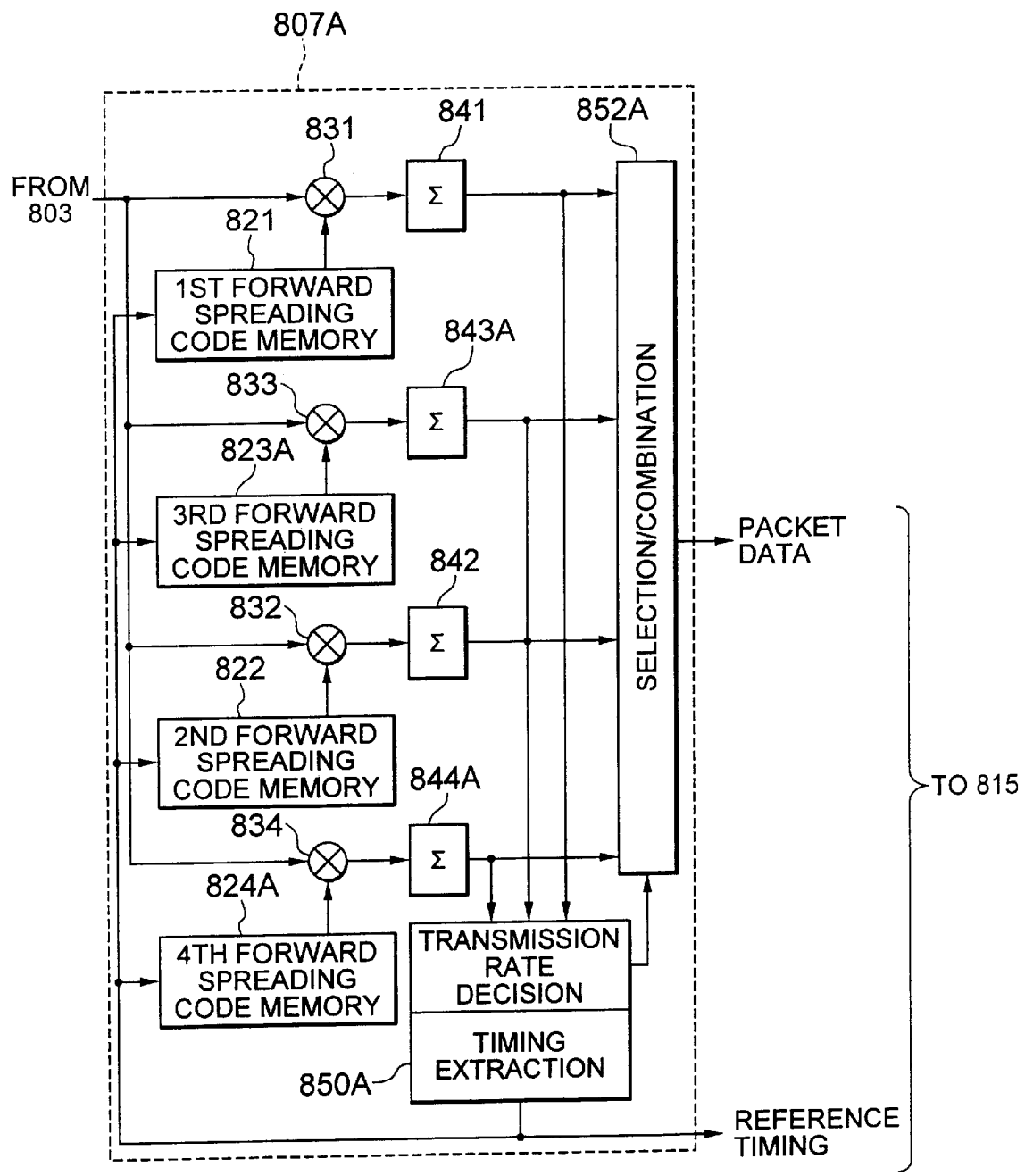
FIG. 13 is a block diagram of another packet demodulator for use in the mobile station illustrated in FIG. 10.

Turning to FIG. 13, description will proceed to the terminal packet demodulator 807A. The terminal packet demodulator 807A comprises a first terminal forward spreading code memory 821 for storing the first forward spreading code R1(1) for the low transmission rate R1 therein, a second terminal forward spreading code memory 822 for storing the second forward spreading code R2(1) for the medium transmission rate R2 therein, a third terminal forward spreading code memory 823A for storing the third forward spreading code R1(2) for the low transmission rate R1 therein, a fourth terminal forward spreading code memory 824A for storing a fourth forward spreading code for the medium transmission rate R2 therein, first through fourth terminal multipliers 831, 832, 833, and 834, first through fourth accumulators 841, 842, 843A, and 844A, a decision and timing extracting section 850A, and a selecting and combining unit 852A.

The first through the fourth terminal spreading code memories 821 to 824A are supplied with a reference timing signal from the decision and timing extracting section 850A. Responsive to the reference timing signal, the first through the fourth terminal spreading code memories 821 to 824A produce the first through the fourth forward spreading codes stored therein, respectively. The first through the fourth forward spreading codes are supplied to the first through the fourth terminal multipliers 831 to 834, respectively. The first through the third terminal multipliers 831 to 834 are supplied with the received forward signal from the H-band receiver 803 (FIG. 10).

The first terminal multiplier 831 multiplies the received forward signal by the first forward spreading code to produce a first terminal multiplied signal. The second terminal multiplier 832 multiplies the received forward signal by the second forward spreading code to produce a second terminal multiplied signal. The third terminal multiplier 833 multiplies the received forward signal by the third forward spreading code to produce a third terminal multiplied signal. The fourth terminal multiplier 834 multiplies the received forward signal by the fourth forward spreading code to produce a fourth terminal multiplied signal. The first through the fourth terminal multiplied signals are supplied to the first through the fourth accumulators 841, 842, 843A, and 844A, respectively. The first accumulator 841 accumulates the first terminal multiplied signal every a length of the first forward spreading code to produce a first accumulated signal. The second accumulator 842 accumulates the second terminal multiplied signal every a length of the second forward spreading code to produce a second accumulated signal. The third accumulator 843A accumulates the third terminal multiplied signal every a length of the third forward spreading code to produce a third accumulated signal. The fourth accumulator 844A accumulates the fourth terminal multiplied signal every a length of the fourth forward spreading code to produce a fourth accumulated signal. The first through the fourth accumulated signals are supplied to the decision and timing extracting section 850A and the selecting and combining unit 852A.

The decision and timing extracting section 850A decides possibility of a plurality of transmission rates on the basis of a cyclic redundancy check (CRC) error or the like in the first through the fourth accumulated signals to supply a decided result signal indicative of the possibility of the transmission rates to the selecting and combining unit 852A. When the decided result signal indicates that the received signal is transmitted using a plurality of forward spreading codes, the selecting and combining unit 852A combines two or more of the first through the fourth accumulated signals into a combined accumulated signal. The selecting and combining unit 852A produces either the selected accumulated signal or the combined accumulated signal as the forward packet which is supplied to the terminal packet control apparatus 815. In addition, the decision and timing extracting section 850A extracts or generates, in response to the decided result signal, the reference timing signal from the first through the fourth accumulated signals. The reference timing signal is supplied to the first through the fourth terminal spreading code memories 821 to 824A and the terminal packet control apparatus 815 (FIG. 10).

While this invention has thus far been described in conjunction with a few preferred embodiments thereof, it will now be readily possible for those skilled in the art to put this invention into various other manners. For example, the number of the forward spreading codes is not restricted those in the above-mentioned embodiments and any number may be used.

What is claimed is:

1. A code division multiple access (CDMA) communication method in a CDMA communication system comprising a base station and a plurality of mobile stations, said CDMA communication method comprising:

dividing a communication band between said base station and said plurality of mobile stations into a forward frequency band for transmitting a forward packet from said base station to each mobile station and a reverse frequency band for transmitting a reverse packet from each mobile station to said base station;

applying a forward spreading code to said forward packet, said forward spreading code spreading said forward packet relative to the amount of data in said forward packet; and making a forward bandwidth for the forward packet differ from a reverse bandwidth for the reverse packet.

2. A CDMA communication method as claimed in claim 1, further comprising using said forward frequency band for the forward packets from said base station to each mobile station in common.

3. A CDMA communication method as claimed in claim 2, further comprising:

spreading, in said base station, a spectrum of the forward packet including a destination terminal identifier using said forward spreading code to produce a spread spectrum forward packet; and transmitting, from said base station, the spread spectrum forward packet by using said forward frequency band.

4. A CDMA communication method as claimed in claim 3, wherein said base station simultaneously transmits a plurality of forward packets which are spread spectrum using different forward spreading codes.

5. A CDMA communication method as claimed in claim 3, further comprising:

dividing said reverse frequency band into a plurality of reverse channels;

assigning each mobile station with, as selected reverse channel, one having a bandwidth corresponding to a reverse information amount of said mobile station selected from the plurality of reverse channels;

monitoring, in each mobile station, the forward packet transmitted by using said forward frequency band; and transmitting, from a specific mobile station being a destination of the forward packet, a reply signal by using the selected reverse channel assigned to the specific mobile station.

6. A CDMA communication method as claimed in claim 5, wherein said base station simultaneously transmits a plurality of forward packets which are spread spectrum using different forward spreading codes.

7. A CDMA communication method as claimed in claim 5, wherein the reply signal includes information indicative of a reception level of the forward packet.

8. A CDMA communication method as claimed in claim 3, further comprising:

dividing said reverse frequency band into a plurality of reverse channels;

assigning each mobile station with, as a selected reverse channel, one having a bandwidth corresponding to a reverse information amount of said mobile station selected from the plurality of reverse channels;

monitoring, in each mobile station, the forward packet transmitted by using said forward frequency band; and transmitting, from a specific mobile station being a destination of the forward packet, a reply signal by using the selected reverse channel assigned to the specific mobile station with the reply signal spread spectrum using a reverse spreading code.

9. A CDMA communication method as claimed in claim 8, wherein said base station simultaneously transmits a plurality of forward packets which are spread spectrum using different forward spreading codes.

10. A CDMA communication method as claimed in claim 8, wherein the reply signal includes information indicative of a reception level of the forward packet.

11. A CDMA communication method as claimed in claim 3, further comprising:

preliminarily determining, in said base station, a plurality of forward spreading codes for use in spreading a spectrum of the forward packet, said forward spreading code spreading said forward packet relative to the amount of data in said forward packet;

dividing, in said base station, the forward packet in an information amount able to transmit by using said forward frequency band using respective forward spreading codes into divided forward packets; and transmitting, from said base station, the divided forward packets by using said forward frequency band at a rate determined by said forward spreading code.

12. A CDMA communication method as claimed in claim 11, wherein said base station simultaneously transmits the divided forward packets which are spread spectrum using different forward spreading codes.

13. A spread spectrum communication system comprising a base station and a plurality of mobile stations, a communication band between said base station and each mobile station comprising a forward frequency band for transmitting a forward packet from said base station to each mobile station and a reverse frequency band for transmitting a reverse packet from each mobile station to said base station, the forward frequency band being used for each mobile station in common, the reverse frequency band comprising a plurality of reverse channels, the each mobile station being assigned with at least one of the reverse channels, said base station comprising:

base station modulating means for spreading a spectrum of the forward packet including a destination terminal identifier using a forward spreading code to produce a spread spectrum forward packet; and base station transmitting means, connected to said base station modulating means, for transmitting the spread spectrum forward packet by using the forward frequency band at a rate determined by said forward spreading code.

14. A spread spectrum communication system as claimed in claim 13, wherein said base station modulating means includes adding means for adding a plurality of spread spectrum forward packets to produce an added spread spectrum forward packet.

15. A spread spectrum communication system as claimed in claim 13, wherein said base station further comprises:

reply signal receiving means for receiving a spread spectrum reply signal on a reverse channel assigned to the each mobile station; and reply signal demodulating means for despreading the spread spectrum reply signal using a reverse spreading code assigned to said mobile station, said reply signal demodulating means reproducing a reply signal.

16. A spread spectrum communication system as claimed in claim 15, wherein each mobile station comprises power measuring means for measuring a reception level of the forward packet to produce a reception level measured signal, the reply signal including the reception level measured signal, said base station further comprising:

separating means, connected to reply signal demodulating means, for separating the reception level measured signal from the reply signal; and adjusting means, connected to said separating means and said base station modulating means, for adjusting, in response to the reception level measured signal, transmission power of the forward packet for said mobile station that is prepared by said base station modulating means.

17. A spread spectrum communication system as claimed in claim 15, wherein each mobile station comprises:

terminal receiving means for receiving the spread spectrum forward packet transmitted on said forward frequency band to produce a received forward packet;

terminal demodulating means, connected to said terminal receiving means, for despreading the received forward packet using the forward spreading code to reproduce the forward packet;

identifying means, connected to said terminal demodulating means, for identifying the destination terminal identifier in the forward packet;

terminal modulating means, connected to said identifying means, for spreading a spectrum of the reply signal using a reverse spreading code assigned to said mobile station when said mobile station has the destination terminal identifier, said terminal modulating means producing the spread spectrum reply signal; and terminal transmitting means, connected to said terminal modulating means, for transmitting the spread spectrum reply signal by using the reverse channel assigned to said mobile station.

18. A spread spectrum communication system as claimed in claim 17, wherein said each mobile station further comprises power measuring means for measuring a reception level of the forward packet to produce a reception level measured signal, the reply signal including the reception level measured signal, said base station further comprising:

separating means, connected to said reply signal demodulating means, for separating the reception level measured signal from the reply signal; and adjusting means, connected to said separating means and said base station modulating means, for adjusting, in response to the reception level measured signal, transmission power of the forward packet for said mobile station that is prepared by said base station modulating means.

19. A spread spectrum communication system as claimed in claim 13, wherein said base station has a plurality of forward spreading codes for use in spreading a spectrum of the forward packet, said base station comprising packet dividing means for dividing the forward packet in an information amount able to transmit on the forward frequency band using the each forward spreading code to produce a plurality of divided forward packets which are supplied to said base station modulating means.

20. A spread spectrum communication system as claimed in claim 19, wherein said base station modulating means includes adding means for adding a plurality of spread spectrum forward packets to produce an added spread spectrum forward packet.

21. A base station for use in a spread spectrum communication system, said base station carrying out radio communication with at least one mobile station, a communication band between said base station and said mobile station comprising a forward frequency band for transmitting a forward packet from said base station to said mobile station and a reverse frequency band for transmitting a reverse packet from said mobile station to said base station, the forward frequency band being used for each mobile station in common, the reverse frequency band comprising a plurality of reverse channels, said base station comprising:

modulating means for spreading a spectrum of the forward packet including a destination terminal identifier using the forward spreading code to produce a spread spectrum forward packet; and transmitting means, connected to said modulating means, for transmitting the spread spectrum forward packet by using the forward frequency band at a rate determined by said forward spreading code.

22. A base station as claimed in claim 21, wherein said modulating means including adding means for adding a plurality of spread spectrum forward packets to produce an added spread spectrum forward packet.

23. A base station as claimed in claim 21, the mobile station being assigned with at least one of the reverse channels, wherein said base station further comprises:

reply signal receiving means for receiving a spread spectrum reply signal on the reverse channel assigned to said mobile station; and reply signal demodulating means, connected to said reply signal receiving means, for despreading the spread spectrum reply signal using a reverse spreading code assigned to said mobile station, said reply signal demodulating means reproducing a reply signal.

24. A base station as claimed in claim 23, wherein the reply signal includes a reception level measured signal indicative of a reception level of the forward packet measured by said mobile station, said base station further comprising:

separating means, connected to reply signal demodulating means, for separating the reception level measured signal from the reply signal; and adjusting means, connected to said separating means and said modulating means, for adjusting, in response to the reception level measured signal, transmission power of the forward packet for said mobile station that is prepared by said modulating means.

25. A base station as claimed in claim 21, wherein said base station has a plurality of forward spreading codes for use in spreading a spectrum of the forward packet, said base station comprising packet dividing means for dividing the forward packet in an information amount able to transmit on the forward frequency band using the each forward spreading code to produce a plurality of divided forward packets which are supplied to said modulating means.

26. A base station as claimed in claim 25, wherein said modulating means includes adding means for adding a plurality of spread spectrum forward packets to produce an added spread spectrum forward packet.

27. A mobile station for use in a spread spectrum communication system, said mobile station carrying out radio communication with a base station, a communication band between said base station and said mobile station comprising a forward frequency band for transmitting a forward packet from said base station to said mobile station and a reverse frequency band for transmitting a reverse packet from said mobile station to said base station, the forward frequency band being used for each mobile station in common, the reverse frequency band comprising a plurality of reverse channels, said mobile station being assigned with at least one of the reverse channels, said mobile station comprising:

receiving means for receiving a spread spectrum forward packet transmitted on said forward frequency band to produce a received forward packet;

demodulating means, connected to said receiving means, for despreading the received forward packet using a forward spreading code to reproduce the forward packet, said forward spreading code having spread said forward packet relative to the amount of data in said forward packet;

identifying means, connected to said demodulating means, for identifying a destination terminal identifier included in the forward packet;

modulating means, connected to said identifying means, for spreading a spectrum of a reply signal using a reverse spreading code assigned to said mobile station when said mobile station has the destination terminal identifier, said modulating means producing a spread spectrum reply signal; and transmitting means, connected to said modulating means, for transmitting the spread spectrum reply signal by using the reverse channel assigned to said mobile station.

28. A mobile station as claimed in claim 27, wherein said mobile station further comprises power measuring means for measuring a reception level of the forward packet to produce a reception level measured signal, the reply signal including the reception level measured signal.

29. A spread spectrum communication system comprising a base station and a plurality of mobile stations, a communication band between said base station and each mobile station comprising a forward frequency band for transmitting a forward packet from said base station to each mobile station and a reverse frequency band for transmitting a reverse packet from each mobile station to said base station, the forward frequency band being used for each mobile station in common, the reverse frequency band comprising a plurality of reverse channels, the each mobile station being assigned with at least one of the reverse channels, said base station comprising:

base station modulator for spreading a spectrum of the forward packet including a destination terminal identifier using a forward spreading code to produce a spread spectrum forward packet, said forward spreading code spreading said forward packet relative to the amount of data in said forward packet; and base station transmitter, connected to said base station modulator, for transmitting the spread spectrum forward packet by using the forward frequency band.

30. A spread spectrum communication system as claimed in claim 29, wherein said base station modulator includes an adder for adding a plurality of spread spectrum forward packets to produce an added spread spectrum forward packet.

31. A spread spectrum communication system as claimed in claim 29, wherein said base station further comprises:

reply signal receiver for receiving a spread spectrum reply signal on a reverse channel assigned to the each mobile station; and reply signal demodulator, connected to said reply signal receiver, for despreading the spread spectrum reply signal using a reverse spreading code assigned to said mobile station, said reply signal demodulator reproducing a reply signal.

32. A spread spectrum communication system as claimed in claim 31, wherein each mobile station comprises a power measuring unit for measuring a reception level of the forward packet to produce a reception level measured signal, the reply signal including the reception level measured signal as a part, said base station further comprising:

a separating unit, connected to said reply signal demodulator, for separating the reception level measured signal from the reply signal; and an adjusting unit, connected to said separating unit and said base station modulator, for adjusting, in response to the reception level measured signal, transmission power of the forward packet for said mobile station that is prepared by said base station modulator.

33. A spread spectrum communication system as claimed in claim 31, wherein each mobile station comprises:

a terminal receiver for receiving a spread spectrum forward packet transmitted on said forward frequency band to produce a received forward packet;

a terminal demodulator, connected to said terminal receiver, for despreading the received forward packet using the forward spreading code to reproduce the forward packet;

an identifying unit, connected to said terminal demodulator, for identifying the destination terminal identifier in the forward packet;

a terminal modulator, connected to said identifying unit, for spreading a spectrum of the reply signal using a reverse spreading code assigned to said mobile station when said mobile station has the destination terminal identifier, said terminal modulator producing the spread spectrum reply signal; and a terminal transmitter, connected to said terminal modulator, for transmitting the spread spectrum reply signal by using the reverse channel assigned to said mobile station.

34. A spread spectrum communication system as claimed in claim 33, wherein said each mobile station further comprises a power measuring unit for measuring a reception level of the forward packet to produce a reception level measured signal, the reply signal including the reception level measured signal, said base station further comprising:

a separating unit, connected to said reply signal demodulator, for separating the reception level measured signal from the reply signal; and an adjusting unit, connected to said separating unit and said base station modulator, for adjusting, in response to the reception level measured signal, transmission power of the forward packet for said mobile station that is prepared by said base station modulator.

35. A spread spectrum communication system as claimed in claim 29, wherein said base station has a plurality of forward spreading codes for use in spreading a spectrum of the forward packet, said base station comprising a packet dividing unit for dividing the forward packet in an information amount able to transmit on the forward frequency band using the each forward spreading code to produce a plurality of divided forward packets which are supplied to said base station modulator.

36. A spread spectrum communication system as claimed in claim 35, wherein said base station modulator includes an adder for adding a plurality of spread spectrum forward packets to produce an added spread spectrum forward packet.

37. A base station for use in a spread spectrum communication system, said base station carrying out radio communication with at least one mobile station, a communication band between said base station and said mobile station comprising a forward frequency band for transmitting a forward packet from said base station to said mobile station and a reverse frequency band for transmitting a reverse packet from said mobile station to said base station, the forward frequency band being used for each mobile station in common, the reverse frequency band comprising a plurality of reverse channels, said base station comprising:

a modulator for spreading spectrum of the forward packet including a destination terminal identifier using a forward spreading code to produce a spread spectrum forward packet; and a transmitter, connected to said modulator, for transmitting the spread spectrum forward packet by using the forward frequency band at a rate determined by said forward spreading code.

38. A base station as claimed in claim 37, wherein said modulator includes an adder for adding a plurality of spread spectrum forward packets to produce an added spread spectrum forward packet.

39. A base station as claimed in claim 37, the mobile station being assigned with at least one of the reverse channels, wherein said base station further comprises:

a reply signal receiver for receiving a spread spectrum reply signal on the reverse channel assigned to said mobile station; and a reply signal demodulator, connected to said reply signal receiver, for despreading the spread spectrum reply signal using a reverse spreading code assigned to said mobile station, said reply signal modulator reproducing a reply signal.

40. A base station as claimed in claim 39, wherein the reply signal includes a reception level measured signal indicative of a reception level of the forward packet measured by said mobile station, said base station further comprising:

a separating unit, connected to said reply signal demodulator, for separating the reception level measured signal from the reply signal; and an adjusting unit, connected to said separating unit and said modulator, for adjusting, in response to the reception level measured signal, transmission power of the forward packet for said mobile station that is prepared by said modulator.

41. A base station as claimed in claim 37, wherein said base station has a plurality of forward spreading codes for use in spreading a spectrum of the forward packet, said base station comprising a packet dividing unit for dividing the forward packet in an information amount able to transmit on the forward frequency band using the each forward spreading code to produce a plurality of divided forward packets which are supplied to said modulator.

42. A base station as claimed in claim 41, wherein said modulator includes an adder for adding a plurality of spread spectrum forward packets to produce an added spread spectrum forward packet.

43. A mobile station for use in a spread spectrum communication system, said mobile station carrying out radio communication with a base station, a communication band between said base station and said mobile station comprising a forward frequency band for transmitting a forward packet from said base station to said mobile station and a reverse frequency band for transmitting a reverse packet from said mobile station to said base station, the forward frequency band being used for each mobile station in common, the reverse frequency band comprising a plurality of reverse channels, said mobile station being assigned with at least one of the reverse channels, said mobile station comprising:

a receiver for receiving a spread spectrum forward packet transmitted on said forward frequency band to produce a received forward packet;

a demodulator, connected to said receiver, for despreading the received forward packet using a forward spreading code to reproduce the forward packet, said forward spreading code having spread said forward packet relative to the amount of data in said forward packet;

an identifying unit, connected to said demodulator, for identifying a destination terminal identifier included in the forward packet;

a modulator, connected to said identifying unit, for spreading an a spectrum of a reply signal using a reverse spreading code assigned to said mobile station when said mobile station has the destination terminal identifier, said modulator producing a spread spectrum reply signal; and a transmitter, connected to said modulator, for transmitting the spread spectrum reply signal by using the reverse channel assigned to said mobile station.

44. A mobile station as claimed in claim 43, wherein said mobile station further comprises a power measuring unit for measuring a reception level of the forward packet to produce a reception level measured signal, the reply signal including the reception level measured signal.

* * * * *